UNITED STATES PATENT OFFICE.

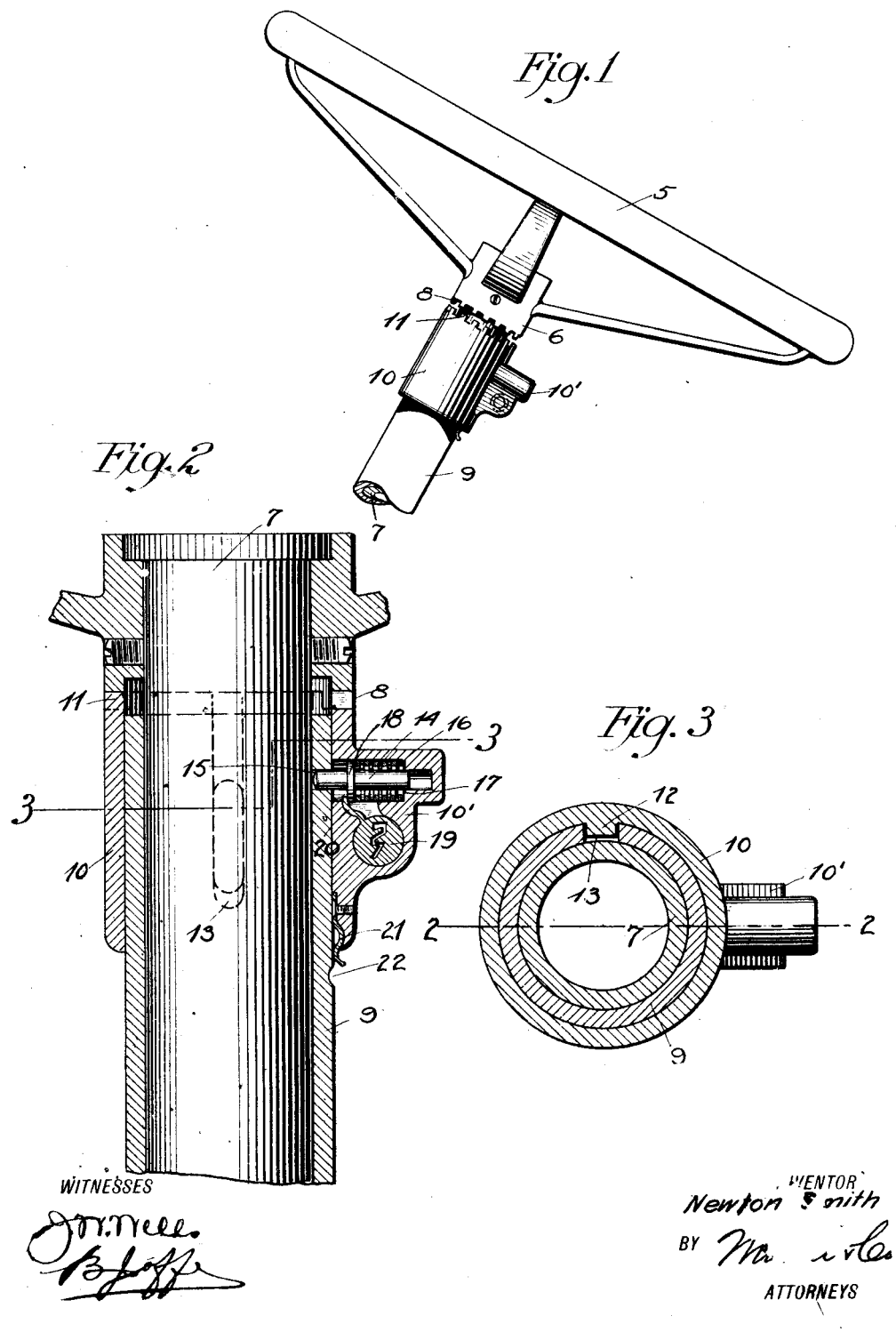

NEWTON SMITH, OF EAST ORANGE, NEW JERSEY.

STEERING-WHEEL LOCK.

1,142,764. Specification of Letters Patent. Patented June 8, 1915.

Application filed August 20, 1914. Serial No. 857,893.

*To all whom it may concern:*

Be it known that I, NEWTON SMITH, a citizen of the United States, and a resident of East Orange, in the county of Essex and State of New Jersey, have invented a new and Improved Steering-Wheel Lock, of which the following is a full, clear, and exact description.

My invention relates to means for locking the steering wheel of an automobile.

An object thereof is to prevent an unauthorized person from unlawfully appropriating the vehicle by driving the same away.

A further object of the invention is to provide a simple, strong, and inexpensive lock which forms part of the steering column and whereby the steering wheel may be locked in any desired position.

A still further object of the invention is to provide a lock for the steering wheel which normally leaves freedom of movement to said wheel.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a side elevation of a steering wheel and column provided with an embodiment of my invention; Fig. 2 is a vertical section on line 2—2, Fig. 3; and Fig. 3 is a horizontal section on line 3—3, Fig. 2.

Referring to the drawings, 5 represents a steering wheel the hub 6 of which engages the upper end of the steering post 7, to which the hub is keyed in any suitable way. The lower face of the hub 6 is provided with teeth 8, preferably at regular intervals, so as to form a toothed surface.

Mounted on the housing 9 of the steering post is a sleeve 10 the under surface of which is provided with teeth 11 similar to the teeth 8 and adapted to interengage therewith. The sleeve 10 is mounted to slide on the housing 9 and is prevented from rotating thereon by the provision of a key 12 in the sleeve made to engage a slot 13 in the housing 9. To maintain the engagement of the toothed surfaces of the sleeve 10 and the hub 6 the sleeve 10 is provided with a locking mechanism located in the lateral projection 10' of the sleeve. The locking mechanism consists of a bolt 14 adapted to snap into an aperture 15 provided in the housing 9 when the sleeve 10 is moved into engagement with the hub 6 of the steering wheel 5. The tendency of the bolt 14 to snap into the aperture 15 is obtained by a coil spring 16 positioned in a recess 17, against the bottom of which recess one end of the spring 16 abuts. The other end of the spring rests against a flange or collar 18 provided on the bolt 14. This engagement of the sleeve with the hub will lock the wheel and prevent the turning of the same.

To unlock the sleeve 10 from the hub a key mechanism 19 is provided in the lateral projection 10' below the bolt 14. The said key mechanism 19 is provided with a tongue 20 engaging the flange 18. By actuating the key mechanism 19 the bolt 14 is retracted from the aperture 15 in compressing the spring 16. The sleeve can then be disengaged from the hub 6 with the locking end of the bolt 14 resting against the housing 9. From the above it will be seen that to lock the steering wheel in any of the desired positions it is only necessary to shift the sleeve 10 toward the wheel when the bolt 14 will automatically engage the aperture 15 and lock the wheel to the housing preventing the turning of the wheel. To unlock the wheel it is necessary to have the exact key that will suit the key mechanism 19.

To prevent interference of the sleeve 10 with the steering wheel 5 on very rough roads, a catch mechanism for the sleeve 10 is provided which consists of a spring 21 adapted to snap into a groove 22 provided on the housing 9 when the sleeve is moved into normal unlocking position, as shown in Fig. 1.

In cases where the steering post is not provided with a housing, the locking mechanism can be mounted on a bearing for the steering post, which bearing is generally secured to the dashboard. But in all events, the locking of the steering wheel is obtained by means provided on the steering column, whereby the steering wheel may be locked in any desired position.

Having thus described my invention, I claim as new and desire to secure by Letters Patent:

In a steering mechanism, a steering wheel, a steering column, a sleeve slidably mounted on the column and prevented from turning thereon, said sleeve having a laterally projecting housing, a bolt slidably 5 mounted in said housing transversely of the axis of the sleeve, a coil spring forcing the bolt toward the axis of the sleeve, said sleeve and steering wheel having toothed surfaces adapted to mesh, said column having an 10 aperture adapted to register with the bolt when said toothed surface of the wheel meshes with the toothed surface of the steering wheel, whereby the steering wheel is locked to the steering column, key operable 15 means in said housing and associated with said bolt, whereby said bolt may be retracted from the aperture in the column, and a flat spring carried by the sleeve, said column having a notch adapted to be engaged by said spring whereby said sleeve is locked 20 to the column when said sleeve is disengaged from the steering wheel.

In testimony whereof I have signed my name to this specification in the presence of two subscribing witnesses.

NEWTON SMITH.

esses:
BENEDICT JOFFE,
GEORGE H. EMSLIE.